Patented July 3, 1928.

1,675,674

UNITED STATES PATENT OFFICE.

IMRE SZARVASY, OF BUDAPEST, HUNGARY.

PROCESS FOR THE PRODUCTION OF CARBON ELECTRODES.

No Drawing. Application filed March 16, 1927, Serial No. 175,937, and in Germany November 15, 1926.

It has already been proposed to produce carbon electrodes from gases containing methane, as for example natural gas by subjecting the natural gas to heat cleavage in such a manner that an intimate mixture of soot-like and tar-like products results, which if necessary after further addition of binding means is moulded and burnt in known manner.

It has been found that carbon electrodes may be produced in a more economical manner and of even better quality if the intimate mixture of more or less finely divided carbons and tar-like products, obtained during the heat cleavage of the natural gas, in addition to the carbon depositing in a solid coherent form on the walls of the decomposition vessel, in varying quantities depending on the operating conditions, is not moulded and pressed directly but is first of all heated to such an extent that the tar-like components of the mixture are coked, the coked mass being subsequently ground in a manner per se known, and, after the addition of binding means in known manner, moulded and burnt. In the heating of the mixture of carbons and tar-like components for the purpose of coking, a product is formed which is particularly suitable for the production of electrodes, this being clearly due to its molecular properties. This results from the fact that the porosity of the electrodes produced in the manner described is less than that of the previous carbon electrodes, while the resistance to fire, durability and resistance to chemical influences are especially great.

The hard carbon deposited, during the production of the carbon-tar mixture, from the natural gas on the walls of the decomposition vessel in a solid coherent form, has the same valuable properties for the production of electrodes as the carbons mentioned above and it may be worked up to electrodes by itself or together with the coked carbon-tar mixture.

It has proved advantageous to effect the coking of the carbon-tar mixture not in an inert atmosphere but in the presence of a hydrocarbon, for example, in a current of natural gas or methane or of the methane-hydrogen mixture, obtained during the production of the carbon-tar mixture, at a temperature at which the gas or the gas-mixture is at least partially decomposed and the carbon resulting is added to the coking carbon-tar mixture. The product of coking is then ground and worked up to electrodes in a manner per se known.

*Example.*—In a tubular retort of a diameter of 0.5 m. and a length of 2 meters, lined with carbon rings, methane was decomposed at a temperature of approximately 1300° C. The quantity of methane passing hourly through the retort, was 20 m³. A mixture of finely divided carbon and of solid hard carbon was thus obtained in a relation of approximately 70:30%; besides these, a variable quantity of a mixture of soot and tar-like products was obtained. The material produced in this manner, was heated in a flow of mixture of methane and hydrogen, till all the tar-like constituents were coked. The coked product formed a solid and highly refractory material. This product was then ground to the usual fineness and manufactured into electrodes in the usual manner.

Having now particularly described and ascertained the nature of my said invention and in what manner the same is to be performed, I declare, that what I claim is:—

1. Process for the production of carbon electrodes from gases containing methane, as for example natural gas, comprising subjecting the gas to heat cleavage in such a manner, that a mixture of finely divided carbon and tar like products and in addition solid coherent hard carbon are formed, mixing the molecular mixture of the finely divided carbon and tar like products with the solid coherent hard carbon, coking this mixture and grinding, mixing with binding agents, moulding and burning it to a finish in a manner per se known.

2. Process for the production of carbon electrodes from gases containing methane, as for example natural gas, comprising subjecting the gas to heat cleavage in such a manner, that a mixture of finely divided carbon and tar like products and in addition solid coherent hard carbon are formed, mixing these two products and heating the mixture thus obtained in a current of gas containing methane to the decomposition temperature thereof, whereby the mixture becomes coked and grinding, mixing with binding agents, moulding and burning it to a finish in a manner per se known.

In testimony whereof I affix my signature.

IMRE SZARVASY.